(12) United States Patent
Yang et al.

(10) Patent No.: US 9,878,740 B2
(45) Date of Patent: Jan. 30, 2018

(54) ACTIVE STEERING SYSTEM FOR ARTICULATED BUS

(71) Applicant: Aleees Eco Ark Co. Ltd., Bade, Taoyuan County (TW)

(72) Inventors: Anthony Antao Yang, Bade (TW); Gordon Ching Chen, Bade (TW)

(73) Assignee: ALEEES ECO ARK (CAYMAN) CO. LTD., Grand Cayman (KY)

( * ) Notice: Subject to any disclaimer, the term of this patent is extended or adjusted under 35 U.S.C. 154(b) by 0 days.

(21) Appl. No.: 15/029,868

(22) PCT Filed: Oct. 16, 2013

(86) PCT No.: PCT/CN2013/085341
§ 371 (c)(1),
(2) Date: Apr. 15, 2016

(87) PCT Pub. No.: WO2015/054854
PCT Pub. Date: Apr. 23, 2015

(65) Prior Publication Data
US 2016/0280260 A1    Sep. 29, 2016

(51) Int. Cl.
*B62D 12/00* (2006.01)
*B62D 13/00* (2006.01)
(Continued)

(52) U.S. Cl.
CPC ............. *B62D 12/00* (2013.01); *B60D 1/322* (2013.01); *B60D 1/62* (2013.01); *B60D 5/00* (2013.01);
(Continued)

(58) Field of Classification Search
CPC .......... B62D 5/046; B62D 5/064; B62D 5/14; B62D 5/20; B62D 6/002; B62D 13/00
See application file for complete search history.

(56) References Cited

U.S. PATENT DOCUMENTS

| 3,834,480 A | 9/1974 | McGee |
| 4,133,552 A | 1/1979 | Sheine |

(Continued)

FOREIGN PATENT DOCUMENTS

| CN | 201400056 | 2/2010 |
| CN | 101934819 | 1/2011 |

(Continued)

*Primary Examiner* — Anne Marie Boehler
*Assistant Examiner* — Marlon A Arce
(74) *Attorney, Agent, or Firm* — Kirton McConkie; Evan R. Witt

(57) ABSTRACT

An active steering system for an articulated bus is provided. In an assisted steering mode, a hydraulic turntable assists in the steering action of the articulated bus. While the articulated bus is linearly driven at a high speed or the lane-changing action is performed, the assisted steering mode can provide stable driving performance. In the assisted steering mode, a better steering trajectory is achieved while a cornering action of the articulated bus is performed. By collecting the information about the driving velocity, the position of the transmission gear and the position of the steering wheel, a steering force applied to the front frame and the trailer frame is calculated. Moreover, if the control unit judges that the angle of the hydraulic turntable is optimal, a locking force is generated to assure the optimal angle of the articulated bus. The assisted steering mode also supports the action of reversing the articulated bus. When the articulated joint is adjusted to an optimal trajectory, the articulated bus is reversed to the designated position.

5 Claims, 4 Drawing Sheets

(51) Int. Cl.
  *B60D 1/32* (2006.01)
  *B60D 1/62* (2006.01)
  *B60D 5/00* (2006.01)
  *B62D 5/04* (2006.01)
  *B62D 5/06* (2006.01)
  *B62D 5/20* (2006.01)
  *B62D 6/00* (2006.01)
  *B62D 47/02* (2006.01)
  *B62D 5/14* (2006.01)
  *B62D 13/06* (2006.01)

(52) U.S. Cl.
  CPC ............. *B62D 5/046* (2013.01); *B62D 5/064* (2013.01); *B62D 5/14* (2013.01); *B62D 5/20* (2013.01); *B62D 6/002* (2013.01); *B62D 13/00* (2013.01); *B62D 13/06* (2013.01); *B62D 47/025* (2013.01)

(56) References Cited

U.S. PATENT DOCUMENTS

| | | | |
|---|---|---|---|
| 4,249,629 A * | 2/1981 | Hutt | B60B 9/02 180/418 |
| 4,351,408 A | 9/1982 | Moll | |
| 4,366,966 A | 1/1983 | Ratsko et al. | |
| 4,616,841 A | 10/1986 | Reichl | |
| 5,244,226 A | 9/1993 | Bergh | |
| 5,329,451 A | 7/1994 | Notsu | |
| 7,412,315 B2 | 8/2008 | Wildey et al. | |
| 7,896,125 B2 | 3/2011 | Ivantysynova et al. | |
| 2006/0138746 A1* | 6/2006 | Donnard | B60D 1/242 280/492 |
| 2010/0013190 A1* | 1/2010 | Koch | B60D 1/30 280/492 |
| 2010/0181743 A1 | 7/2010 | Timmons, Jr. | |
| 2016/0257176 A1* | 9/2016 | Tabellini | B60D 1/322 |

FOREIGN PATENT DOCUMENTS

| | | |
|---|---|---|
| CN | 103287491 | 9/2013 |
| DE | 3305751 | 8/1984 |
| DE | 10256307 | 6/2004 |
| EP | 0217058 | 4/1987 |
| EP | 0253964 | 1/1988 |
| EP | 0446614 | 9/1991 |
| JP | S62149557 A | 7/1987 |
| JP | H09207797 A | 8/1997 |
| JP | 2001088752 A | 4/2001 |
| JP | 2002154445 A | 5/2002 |
| JP | 2007320362 A | 12/2007 |
| JP | 2008-44428 | 10/2009 |
| JP | 2010132238 A | 6/2010 |

\* cited by examiner

ACTIVE STEERING SYSTEM FOR ARTICULATED BUS

FIELD OF THE INVENTION

The present invention relates to an active steering system and a control method for increasing the driving performance of an articulated bus on a road intersection or a road curve, and more particularly to an active steering system for using a hydraulic turntable to reduce the turning radius of an articulated bus and providing a passive damping force to stabilize an articulated joint.

BACKGROUND OF THE INVENTION

Generally, the turning radius of the commercially available articulated bus is very large, and thus the articulated bus cannot be directly reversed. In the urban areas without exclusive bus lanes, the routing arrangement is difficult and has many restrictions. For increasing the operative and practical values of the articulated bus, it is necessary to develop an active steering system. Consequently, the articulated bus can provide better service in the areas with restricted road intersections or road curves.

Conventionally, an articulated joint provides a passive damping force to stabilize an articulated joint. For example, a mechanical damping means or a hydraulic damping means is usually used. The conventional articulated joint and the steering system and the vehicle control unit usually belong to different systems. For providing an active steering system, it is necessary to integrate the articulated joint into the vehicle control unit.

Industrially, an articulated trailer used to transport raw materials or goods has mechanical steering joints or hydraulic steering joints (or referred as tractor joints) for changing the travelling direction in response to the applied force. However, these tractor joints are directly controlled according to the position of the steering wheel. Moreover, the tractor trailers are unlike the articulated bus that uses a set of steering front wheels to change the advancing direction. In other words, the mechanical steering joint or the hydraulic steering joint is the only way for the tractor trailer to change the advancing direction. The present invention provides an articulated joint capable of actively assisting in the steering operation. By slowly applying a steering force and locking the joint at an optimal angle, the articulated joint can be controlled. That is, the articulated joint is not proportionally or directly linked to the position of the steering wheel.

SUMMARY OF THE INVENTION

An object of the present invention provides an active steering system for an articulated bus. By detecting the position of a steering wheel, a driving velocity and a signal of a transmission gear, the active steering system can assist in a steering action of the articulated bus. The active steering system includes a hydraulic turntable. A calculated force is applied to the hydraulic turntable in order to assist in the steering action of the articulated bus. Moreover, when a front frame and a trailer frame are at a preset angle corresponding to the signal, the optimal angle is maintained.

Another object of the present invention provides an active steering system for an articulated bus. The active steering system can identify whether a lane-changing action or a steering action of the articulated bus by processing a set of messages.

In accordance with an aspect of the present invention, there is provided an active steering system for an articulated vehicle having a steerable front axle. The active steering system includes a joint base, a suspension arm, a hydraulic turntable, a main hydraulic pump, a servo motor and a control unit. The joint base and the suspension arm are used for connecting a front frame with a trailer frame. The front frame and the suspension arm are rotated relative to each other through the joint base and the suspension arm. The hydraulic turntable is installed on the joint base for adjusting a joint angle between the front frame and the trailer frame. The hydraulic turntable includes a hydraulic motor, a pressure regulating valve, a ring gear, a small gear and a bearing. The servo motor is connected with the main hydraulic pump. The main hydraulic pump and the servo motor are installed in a chamber of the trailer frame. The main hydraulic pump and the servo motor transfer a hydraulic oil to the hydraulic motor through a first hydraulic tube and a second hydraulic tube so as to provide a control torsion force in a clockwise direction or a counterclockwise direction. The control unit controls an assisted steering mode. In the assisted steering mode, a target joint angle is determined according to a position information of a steering wheel, and the control unit instructs the servo motor to pressurize the hydraulic oil and turn the hydraulic turntable at a calculated angular velocity according to a velocity of the articulated vehicle until a joint angle between the front and the trailer frame reaches the target joint angle.

In an embodiment, the target joint angle is in proportion to the position information of the steering wheel.

In an embodiment, the target joint angle is limited by the velocity of the articulated vehicle.

In an embodiment, the angular velocity of the hydraulic turntable is limited by the velocity of the articulated vehicle.

In accordance with another aspect of the present invention, there is provided an active steering system for an articulated bus. The active steering system includes a joint base, a suspension arm, a hydraulic turntable, a main hydraulic pump, a servo motor and a control unit. The joint base and the suspension arm are used for connecting a front frame with a trailer frame. The front frame and the suspension arm are rotated relative to each other through the joint base and the suspension arm. The hydraulic turntable is installed on the joint base for adjusting a joint angle between the front frame and the trailer frame. The hydraulic turntable includes a hydraulic motor, a pressure regulating valve, a ring gear, a small gear and a bearing. The servo motor is connected with the main hydraulic pump. The main hydraulic pump and the servo motor are installed in a chamber of the trailer frame. The main hydraulic pump and the servo motor transfer a hydraulic oil to the hydraulic motor through a first hydraulic tube and a second hydraulic tube so as to provide a control torsion force in a clockwise direction or a counterclockwise direction. The control unit controls an assisted steering mode. In the assisted steering mode, a target joint angle is determined according to a position information of a steering wheel, and the control unit instructs the servo motor to pressurize the hydraulic oil and turn the hydraulic turntable at a calculated angular velocity according to a velocity of the articulated bus until a joint angle between the front and the trailer frame reaches a target joint angle.

The above contents of the present invention will become more readily apparent to those ordinarily skilled in the art after reviewing the following detailed description and accompanying drawings, in which:

DETAILED DESCRIPTION OF THE PREFERRED EMBODIMENT

In accordance with the concept of the present invention, an active steering system is provided for increasing the driving performance of an articulated bus with a front frame and a trailer frame. The articulated bus comprises a set of steering front wheels, a set of intermediate wheels and a set of rear wheels. These wheels are installed on the front frame and the trailer frame. Generally, the driving shaft of the power system is connected with the rear wheels of the articulated bus in order to drive the articulated bus. In addition, an articulated joint in a middle zone is used for reducing the turning radius. However, if the steering action is performed while the articulated bus is driven on a narrow road, a series of forward and backward motions are needed to adjust the articulated joint to the desired angle. Moreover, while the articulated bus is revered to a parking position, it is necessary to adjust the angle of the articulated bus in the leftward or rightward direction. Under this circumstance, the driver requires extreme caution and pays attention to the surroundings in order to avoid the accident. Therefore, it is important to design the active steering system for the articulated bus.

For providing a practical active steering system to the articulated bus, the following situations should be taken into consideration.

Firstly, when the articulated bus is driven on a ring-shaped road intersection, the position of the steering wheel is maintained along an anticipated ring-shaped trajectory. Meanwhile, the hydraulic turntable is in an assisted steering mode. Moreover, the articulated joint should be adjusted to an optimal angle until the joint angle has been adjusted by the steering wheel.

Secondly, while the articulated bus is reversed to a parking position, if the parking position has no sufficient space for adjusting the angle of the articulated bus in the leftward or rightward direction, the articulated joint should be actively adjusted and maintained at a proper angle according to the joint angle. Consequently, the articulated bus can be directly reversed to the parking position instead of adjusting the articulated angle in the leftward or rightward direction.

Figure 1:
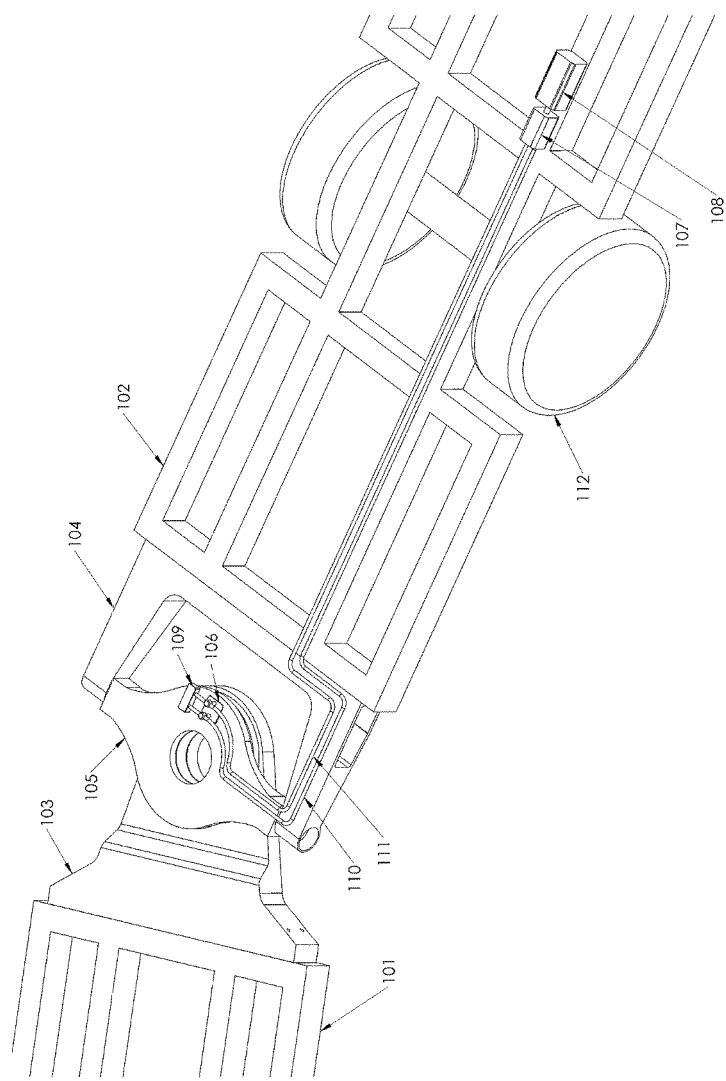
FIG. 1 is a schematic isometric view illustrating an active steering system for an articulated bus according to an embodiment of the present invention.
Figure 2:
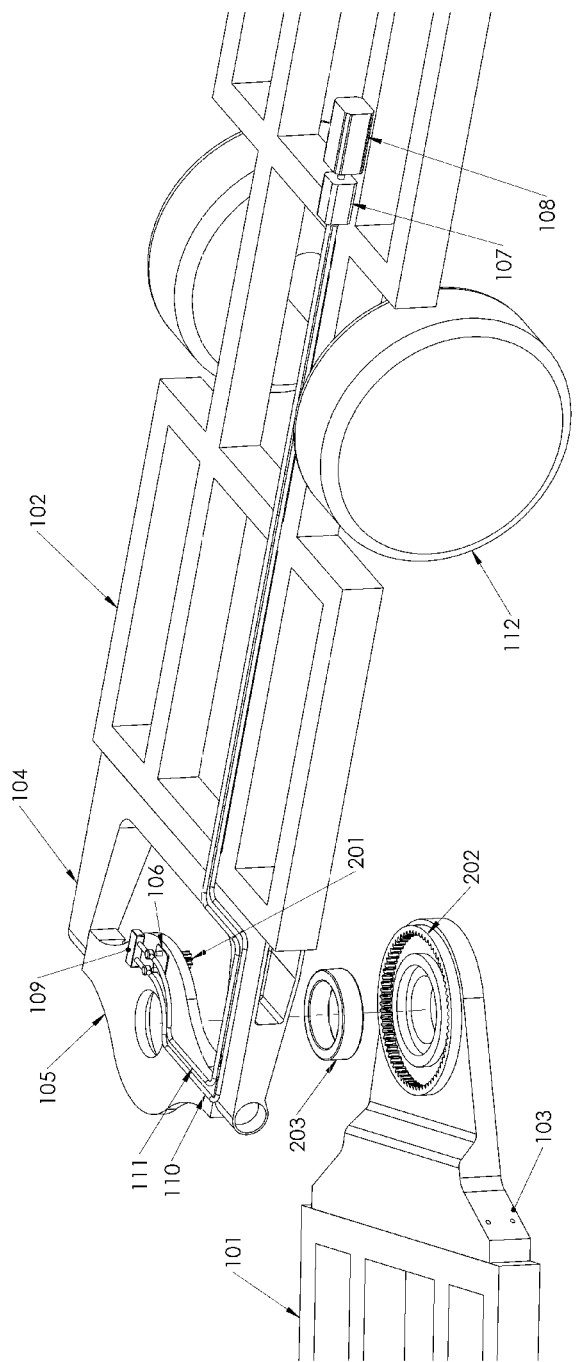
FIG. 2 is a schematic exploded view illustrating the active steering system for the articulated bus according to the embodiment of the present invention.

FIGS. 1 and 2 schematically illustrate the components of an active steering system for an articulated bus according to an embodiment of the present invention. A hydraulic articulated joint comprises a joint base 103, a suspension arm 104 and a hydraulic turntable 105. The joint base 103 is installed on a front frame 101. The suspension arm 104 is installed on a trailer frame 102. The hydraulic turntable 105 is connected with the suspension arm 104 through a shaft. Consequently, the hydraulic turntable 105 is allowed to rotate in a vertical direction. Moreover, the hydraulic turntable 105 comprises a ring gear 202, a small gear 201 and a bearing 203.

The active steering system comprises a control unit and a hydraulic loop. Moreover, a servo motor 108 is installed in an isolated chamber for assuring electric safety. The servo motor 108 is used for driving a main hydraulic pump 107 to pressurize the oil in a first hydraulic tube 110 and a second hydraulic tube 111. The pressurized oil in the first hydraulic tube 110 or the second hydraulic tube 111 drives a hydraulic motor 106 to provide a control torsion force to the small gear 201. The clockwise or counterclockwise direction of the control torsion force is determined according to the direction of the servo motor 108. The control torsion force is transmitted from the small gear 201 to the ring gear 202. Consequently, the hydraulic turntable is rotated and the joint angle of the hydraulic turntable is adjusted according to the command from the control unit.

The hydraulic loop further comprises a pressure regulating valve 109. The pressure regulating valve 109 is a control means of adjusting the maximum hydraulic pressure of the hydraulic loop. The pressure regulating valve 109 is used for controlling the magnitude of a damping force of the hydraulic articulated joint. Consequently, the adjusted oil is allowed to flow through the pressure regulating valve 109 to generate flow resistance in the hydraulic loop. More especially, a controlled drag force is generated to balance the turning action of the hydraulic turntable 105.

During the operation of the active steering system, the control unit reads the position information of the steering wheel and issues a command to the servo moto 108. According to the command, a control torsion force is provided to turn the hydraulic turntable. Consequently, the joint angle is gradually adjusted to match a target joint angle corresponding to the position information of the steering wheel. Then, the control unit instructs the servo motor 108 to use a controlled damping force to maintain a hydraulic pressure in order to lock the hydraulic turntable at the target joint angle.

Figure 3:
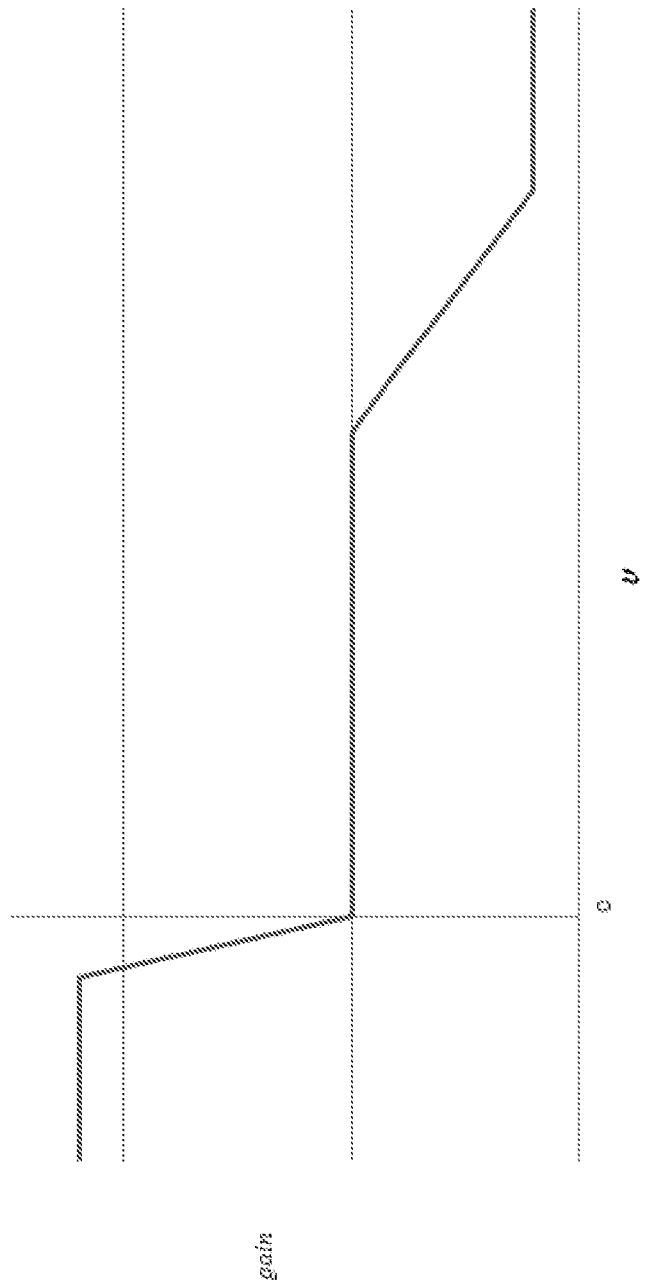
FIG. 3 is a plot illustrating the relationship between the position of the steering wheel and the target joint angle at different velocities.

As shown in FIG. 3, the control unit uses different gain values according to different velocities. In case that the articulated bus is linearly advanced at a higher velocity, the target joint angle is smaller when compared with the articulated bus at a lower velocity. For example, if the steering wheel is turned 15 degrees when the articulated bus is advanced at a velocity of about 40 miles per hour, the target joint angle is set as 5 degrees by the control unit. Whereas, if the steering wheel is turned 15 degrees when the articulated bus is advanced at a velocity of about 5 miles per hour, the target joint angle is set as 10 degrees by the control unit.

Please refer to FIG. 3 again. As the velocity of the articulated bus is increased to exceed a low velocity limit, the gain of the target joint angle is higher because a cornering action needs a larger joint angle. As the velocity of the articulated bus is increased to exceed a high velocity limit, the gain of the target joint angle is reduced. Consequently, the stability of the lane-changing action is enhanced.

Please refer to FIG. 3 again. While the articulated bus is reversed, the gain of the target joint angle corresponding to the angle of the steering wheel is obviously increased because the driving shaft of the articulated bus is installed in the trailer axle. Because of the direction of the trailer axle, a counterforce is generated while the articulated bus is reversed. In response to the counterforce, the articulated joint is pulled to a vertical direction. Moreover, for allowing the articulated bus to be maintained in a continuous road curve, a larger gain is required in the reverse mode.

Figure 4:
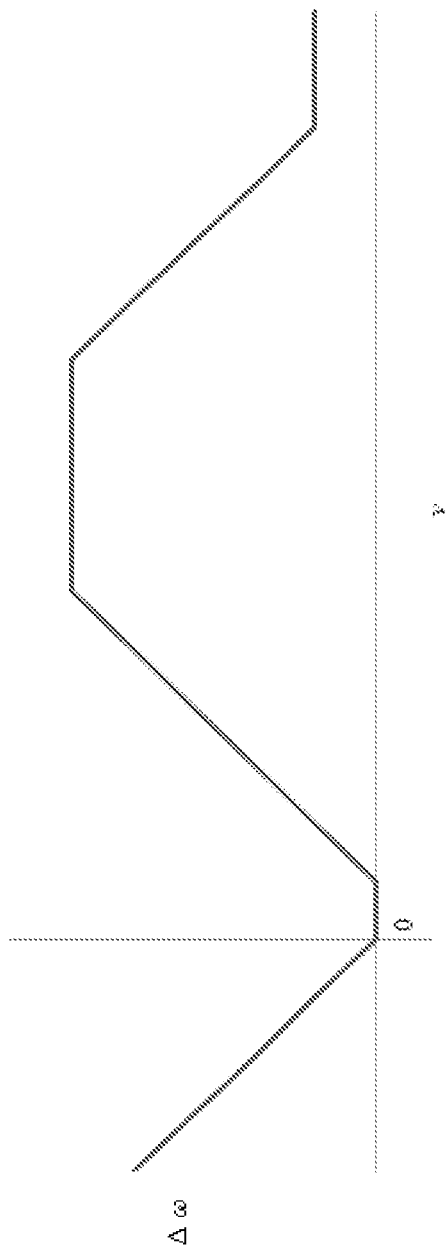
FIG. 4 is a plot illustrating the maximum allowable velocity of the articulated joint at different velocities.

Another implementation example of the active steering system is shown in FIG. 4. The maximum angular velocity of the joint is determined according to the vehicle velocity. In the positive zone close to zero, the articulated bus is driven at a slow velocity in order to accurately control the hydraulic turntable and avoid tire wear. If the velocity of the articulated bus does not exceed a specified velocity limit, the joint angle of the hydraulic turntable is not changed.

Please refer to FIG. 4 again. In case that the vehicle velocity exceeds a high velocity limit, the maximum angular velocity of the hydraulic turntable is limited by the control unit because the stability and comfort of driving the articulated bus are influenced by the tuning speed of the hydraulic turntable. This situation usually happens when the articulated bus is driven on a super highway and the lane-changing action is performed. Consequently, the driving velocity of the articulated bus is directly related to the allowable maximum angular velocity of the hydraulic turntable.

What is claimed is:

1. An active steering system for an articulated vehicle having a steerable front axle, the active steering system comprising:
    a joint base and a suspension arm for connecting a front frame with a trailer frame, wherein the front frame and the suspension arm are rotated relative to each other through the joint base and the suspension arm;
    a hydraulic turntable installed on the joint base for adjusting a joint angle between the front frame and the trailer frame, wherein the hydraulic turntable comprises a hydraulic motor, a pressure regulating valve, a ring gear, a small gear and a bearing;
    a main hydraulic pump and a servo motor, wherein the servo motor is connected with the main hydraulic pump, and the main hydraulic pump and the servo motor are installed in a chamber of the trailer frame, wherein the main hydraulic pump and the servo motor transfer a hydraulic oil to the hydraulic motor through a first hydraulic tube and a second hydraulic tube so as to provide a control torsion force in a clockwise direction or a counterclockwise direction; and
    a control unit for controlling an assisted steering mode, wherein in the assisted steering mode, a target joint angle is determined according to a position information of a steering wheel, and the control unit instructs the servo motor to pressurize the hydraulic oil and turn the hydraulic turntable at a calculated angular velocity according to a velocity of the articulated vehicle until a joint angle between the front and the trailer frame reaches the target joint angle.

2. The active steering system according to claim 1, wherein the target joint angle is in proportion to the position information of the steering wheel.

3. The active steering system according to claim 1, wherein the target joint angle is limited by the velocity of the articulated vehicle.

4. The active steering system according to claim 1, wherein the angular velocity of the hydraulic turntable is limited by the velocity of the articulated vehicle.

5. An active steering system for an articulated bus, the active steering system comprising:
    a joint base and a suspension arm for connecting a front frame with a trailer frame, wherein the front frame and the suspension arm are rotated relative to each other through the joint base and the suspension arm;
    a hydraulic turntable installed on the joint base for adjusting a joint angle between the front frame and the trailer frame, wherein the hydraulic turntable comprises a hydraulic motor, a pressure regulating valve, a ring gear, a small gear and a bearing;
    a main hydraulic pump and a servo motor, wherein the servo motor is connected with the main hydraulic pump, and the main hydraulic pump and the servo motor are installed in a chamber of the trailer frame, wherein the main hydraulic pump and the servo motor transfer a hydraulic oil to the hydraulic motor through a first hydraulic tube and a second hydraulic tube so as to provide a control torsion force in a clockwise direction or a counterclockwise direction; and
    a control unit for controlling an assisted steering mode, wherein in the assisted steering mode, a target joint angle is determined according to a position information of a steering wheel, and the control unit instructs the servo motor to pressurize the hydraulic oil and turn the hydraulic turntable at a calculated angular velocity according to a velocity of the articulated bus until a joint angle between the front and the trailer frame reaches a target joint angle.

* * * * *